US012609425B2

(12) United States Patent
Maniwa et al.

(10) Patent No.: US 12,609,425 B2
(45) Date of Patent: Apr. 21, 2026

(54) SOLID STATE BATTERY

(71) Applicant: Murata Manufacturing Co., Ltd.,
Nagaokakyo (JP)

(72) Inventors: Takeshi Maniwa, Nagaokakyo (JP);
Kenji Oshima, Nagaokakyo (JP);
Osamu Chikagawa, Nagaokakyo (JP);
Naoki Maeda, Nagaokakyo (JP)

(73) Assignee: **MURATA MANUFACTURING CO.,
LTD.**, Nagaokakyo (JP)

( * ) Notice: Subject to any disclaimer, the term of this
patent is extended or adjusted under 35
U.S.C. 154(b) by 601 days.

(21) Appl. No.: 18/061,724

(22) Filed: Dec. 5, 2022

(65) Prior Publication Data

US 2023/0163434 A1      May 25, 2023

Related U.S. Application Data

(63) Continuation of application No.
PCT/JP2021/021945, filed on Jun. 9, 2021.

(30) Foreign Application Priority Data

Jun. 10, 2020    (JP) ................................. 2020-101149

(51) Int. Cl.
*H01M 50/588*          (2021.01)
*H01M 50/103*          (2021.01)
*H01M 50/519*          (2021.01)

(52) U.S. Cl.
CPC ....... *H01M 50/588* (2021.01); *H01M 50/103*
(2021.01); *H01M 50/519* (2021.01)

(58) Field of Classification Search
CPC ............... H01M 50/545; H01M 50/11; H01M
10/0562; H01M 10/0585
See application file for complete search history.

(56) References Cited

U.S. PATENT DOCUMENTS 5,214,308 A      5/1993  Nishiguchi et al.
6,232,015 B1 *  5/2001  Wyser ............... H01M 10/0431
429/94

(Continued)

FOREIGN PATENT DOCUMENTS

JP          103218039 A      9/1991
JP        2007080812 A      3/2007

(Continued)

OTHER PUBLICATIONS

Tamai et al., JP 5211447 B2, Machine Translation, Jun. 12, 2013
(Year: 2013).*

(Continued)

*Primary Examiner* — Galen H Hauth
(74) *Attorney, Agent, or Firm* — ArentFox Schiff LLP

(57)          ABSTRACT

A solid state battery that includes: a battery element body; a
first external electrode on a first end surface of the battery
element body; a second external electrode on a second end
surface of the battery element body; and a protective layer
covering a peripheral surface of the battery element body
that connects the first and second end surfaces. The first
external electrode covers a first end surface of the solid state
battery, and the second external electrode covers a second
end surface of the solid state battery. The first principal
surface and the second principal surface have a pair of a first
convex part and second convex part extending from the first
external electrode to the second external electrode along a
longitudinal direction and located at opposed end parts in a
transverse direction.

15 Claims, 7 Drawing Sheets

(56)  References Cited

U.S. PATENT DOCUMENTS

| | | | | |
|---|---|---|---|---|
| 6,630,270 B1 * | 10/2003 | Kim | .................... | H01M 50/103 |
| | | | | 429/94 |
| 8,895,167 B2 * | 11/2014 | Kim | .................... | H01M 50/645 |
| | | | | 429/94 |
| 9,087,643 B1 | 7/2015 | Nishibayashi et al. | | |
| 9,159,961 B2 * | 10/2015 | Park | .................... | H01M 50/103 |
| 2007/0042265 A1 | 2/2007 | Tamai et al. | | |
| 2015/0333376 A1 * | 11/2015 | Gaben | ............... | H01M 10/0436 |
| | | | | 29/623.5 |
| 2016/0049242 A1 | 2/2016 | Sawada et al. | | |
| 2017/0229245 A1 | 8/2017 | Nakazawa et al. | | |
| 2020/0381774 A1 * | 12/2020 | Ueno | ................ | H01M 10/0585 |

FOREIGN PATENT DOCUMENTS

| | | | | |
|---|---|---|---|---|
| JP | 2011198692 A | | 10/2011 | |
| JP | 5211447 B2 | * | 6/2013 | |
| JP | 2014239259 A | | 12/2014 | |
| JP | 2015019079 A | | 1/2015 | |
| JP | 2016001601 A | * | 1/2016 | |
| JP | 2017143130 A | | 8/2017 | |

OTHER PUBLICATIONS

Ayaka et al. JP 2016-001601 A, Machine Translation, Jan. 7, 2016 (Year: 2016).*
International Search Report in PCT/JP2021/021945, mailed on Aug. 31, 2021, 3 pages.

* cited by examiner

DEFLECTION
DIRECTION
OF BOARD

DEFLECTION
DIRECTION
OF BOARD

DEFLECTION DIRECTION

SOLID STATE BATTERY

CROSS REFERENCE TO RELATED APPLICATIONS

The present application is a continuation of International application No. PCT/JP2021/021945, filed Jun. 9, 2021, which claims priority to Japanese Patent Application No. 2020-101149, filed Jun. 10, 2020, the entire contents of each of which are incorporated herein by reference.

FIELD OF THE INVENTION

The present invention relates to a solid state battery. More specifically, the present invention relates to a laminated solid state battery formed by laminating layers, each constituting a battery constituent unit.

BACKGROUND OF THE INVENTION

Conventionally, secondary batteries that can be repeatedly charged and discharged have been used for various purposes. For example, each of the secondary batteries is used as a power supply of an electronic device such as a smartphone and a notebook computer.

In a secondary battery, a liquid electrolyte (electrolytic solution) such as an organic solvent has been conventionally used as a medium for moving ions. However, the secondary battery using the electrolytic solution has a problem such as leakage of the electrolytic solution. Therefore, a solid state battery including a solid electrolyte instead of a liquid electrolyte has been developed.

However, when a small-sized solid state battery is housed in a battery housing part of a small-sized electronic device such as a mobile device, if the solid state battery is loaded with dust, current leakage may occur between terminals of different batteries. On the other hand, for example, there has been proposed a solid state battery in which a thickness of a central part of the battery is smaller than a thickness of an end part (for example, Patent Document 1).

Patent Document 1: Japanese Patent Application Laid-Open No. 2016-1601

SUMMARY OF THE INVENTION

In recent years, minimization of components mounted on a board has progressed, and accordingly, a thickness of a mask used for solder printing is reduced. This is because a short circuit between terminals and a short circuit between adjacent components are likely to occur when a solder printing amount increases. On the other hand, in the case of a mounted solid state battery, a size of the solid state battery is required to some extent in order to secure a battery capacity to some extent. Therefore, the mounted solid state battery is likely to be the largest component among mounting components of the board. Therefore, when the solid state battery having the shape as in Patent Document 1 is mounted on a board, a large solder printing amount is required, and thus there is a problem that short-circuiting with other extremely small mounting components easily occurs.

FIG. 12 is a schematic sectional view for explaining this, and illustrates an example in which a solid state battery 100 and a minimal mounting component 200 are mounted on a board 90. The solid state battery 100 includes a power storage body having a positive electrode layer 101 and a negative electrode layer 102 laminated with a solid electrolyte layer 103 interposed therebetween, the positive electrode layer 101 includes a positive electrode current collector layer 104 and a positive electrode active material layer 105, and the negative electrode layer 102 includes a negative electrode current collector layer 106 and a negative electrode active material layer 107. The power storage body is covered with a protective layer 115. A terminal electrode 116 is connected to each of the positive electrode current collector layer 104 and the negative electrode current collector layer 106. When the mounting component 200 is mounted on the board 90, since the mounting component 200 is a minimal component, a thickness of solder layers 96 for securing electrical connection with wiring electrodes 93 and 94 can be reduced. On the other hand, in the case of the solid state battery 100, it is necessary to increase a thickness of solder layers 95 in order to ensure electrical connection between wiring electrodes 91 and 92 and the terminal electrode 116. Then, there is a problem that the solder printing amount increases, and a possibility that a short circuit occurs between adjacent mounting components increases.

Therefore, an object of the present invention is to provide a solid state battery that prevents short circuit from occurring and enables high-density mounting when the solid state battery is mounted together with a minimal component.

In order to solve the above problems, a solid state battery according to one aspect of the present invention includes: a battery element body including a positive electrode layer and a negative electrode layer laminated with a solid electrolyte layer interposed between the positive electrode layer and the negative electrode layer, the battery element body defining a first end surface and a second end surface facing each other, and a peripheral surface between the first end surface and the second end surface; a first external electrode on the first end surface; a second external electrode on the second end surface; and a protective layer covering the peripheral surface of the battery element body, the solid state battery defining a first principal surface and a second principal surface facing each other in a lamination direction of the positive electrode layer and the negative electrode layer, in which the first external electrode covers the first end surface and covers a side of the first end surface of the peripheral surface of the battery element body via the protective layer, the second external electrode covers the second end surface and covers a side of the second end surface of the peripheral surface of the battery element body via the protective layer, and at least one of the first principal surface and the second principal surface include a pair of a first convex part and a second convex part, each of which extend from the first external electrode to the second external electrode along a longitudinal direction connecting the first external electrode and the second external electrode and located at opposed end parts of the solid state battery in a transverse direction to the longitudinal direction.

Furthermore, an electronic device according to another aspect of the present invention is an electronic device including: an elongated board; and the solid state battery according to the one aspect mounted on the board, in which a longitudinal direction of the board and a longitudinal direction connecting a first external electrode and a second external electrode of the solid state battery coincide with each other.

According to the present invention, it is possible to provide a solid state battery capable of preventing short circuit from occurring and enabling high-density mounting when the solid state battery is mounted together with a minimal component.

DETAILED DESCRIPTION OF THE INVENTION

Figure 1:
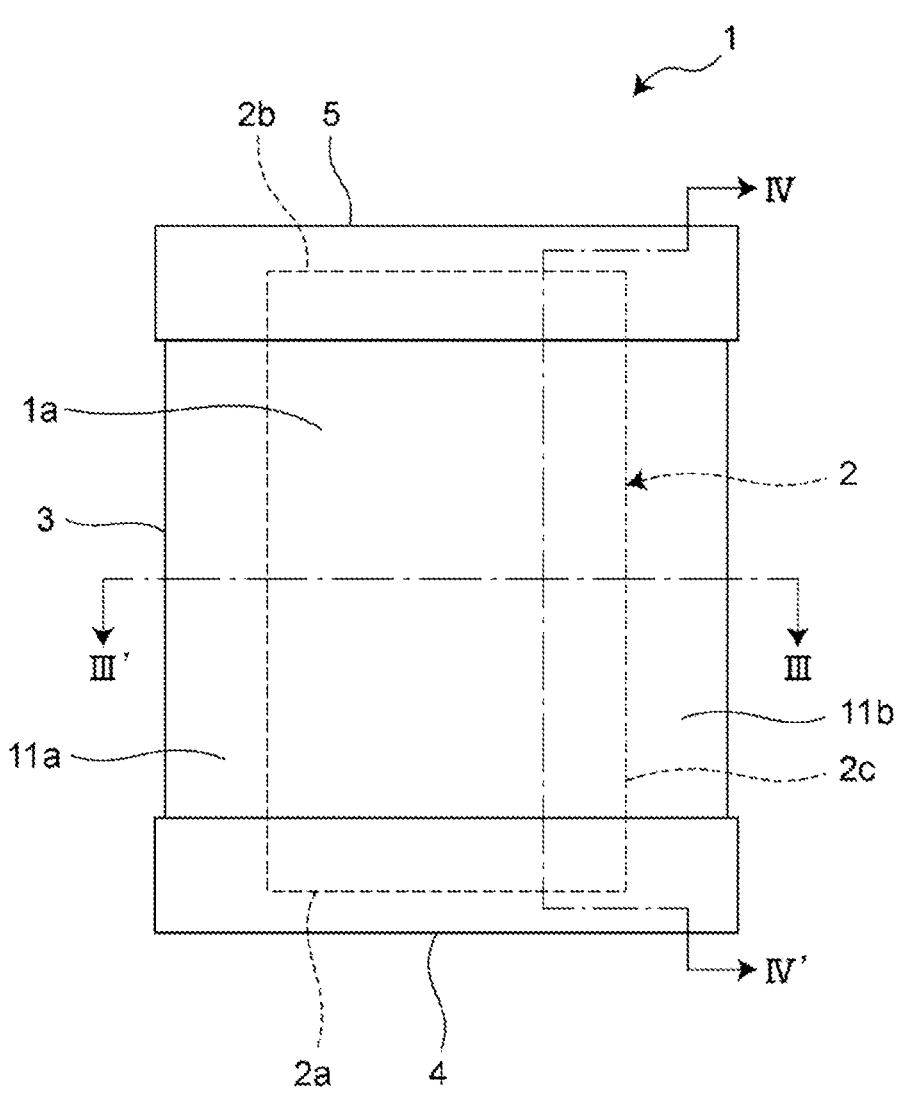
FIG. 1 is a schematic top view illustrating an example of a structure of a solid state battery according to a first embodiment of the present invention.

Hereinafter, the "solid state battery" of the present invention will be described in detail. Although the description will be made with reference to the drawings as necessary, the illustrated contents are only schematically and exemplarily illustrated for the understanding of the present invention, and the appearance, the dimensional ratio, and the like may be different from the actual ones.

The "solid state battery" referred to in the present invention refers to a battery whose constituent elements are composed of a solid in a broad sense, and refers to an all-solid state battery whose battery constituent elements (particularly preferably all battery constituent elements) are composed of a solid in a narrow sense. In a preferred aspect, the solid state battery in the present invention is a laminated solid state battery configured such that layers constituting a battery constituent unit are laminated with each other, and preferably, such layers may be composed of a fired body. The "solid state battery" includes not only a so-called "secondary battery" capable of repeating charging and discharging but also a "primary battery" capable of only discharging. According to a preferred aspect of the present invention, the "solid state battery" is a secondary battery. The "secondary battery" is not excessively limited by its name, and may include, for example, a power storage device and the like.

The term "plan view" as used in the present specification is based on a form in a case where an object is captured from an upper side or a lower side along a thickness direction based on a lamination direction of each layer constituting the solid state battery. Furthermore, the term "sectional view" as used in the present specification is based on a form (to put it briefly, a form in the case of being cut along a plane parallel to the thickness direction) when viewed from a direction substantially perpendicular to the thickness direction based on the lamination direction of each layer constituting the solid state battery. Furthermore, the term "longitudinal direction" as used in the present specification is based on a direction along a long side when the solid state battery is viewed in a plan view, and the term "transverse direction" is based on a direction along a short side when the solid state battery is viewed in a plan view. Note that, in the drawings (FIGS. 2 to 4 and 8 to 11), for convenience, the lamination direction (height direction) of the solid state battery is denoted by T, the longitudinal direction (length direction) of the solid state battery is denoted by L, and the transverse direction (width direction) of the solid state battery is denoted by W. Furthermore, the term "sectional view in the transverse direction" used in the present specification refers to a section when cut along the transverse direction, and the term "sectional view in the longitudinal direction" refers to a section when cut along the longitudinal direction. Furthermore, an "up-down direction" and a "left-right direction" used directly or indirectly in the present specification correspond to an up-down direction and a left-right direction in the drawings, respectively. Unless otherwise specified, the same reference symbols or signs indicate the same members or parts or the same semantic contents. In a preferred aspect, it can be understood that a downward direction in a vertical direction (that is, a direction in which gravity acts) corresponds to a "downward direction", and an opposite direction corresponds to an "upward direction".

First Embodiment

A solid state battery according to the present embodiment includes: a battery element body including a positive electrode layer and a negative electrode layer laminated with a solid electrolyte layer interposed between the positive electrode layer and the negative electrode layer, the battery element body defining a first end surface and a second end surface facing each other, and a peripheral surface between the first end surface and the second end surface; a first external electrode on the first end surface; a second external electrode on the second end surface; and a protective layer covering the peripheral surface of the battery element body, the solid state battery defining a first principal surface and a second principal surface facing each other in a lamination direction of the positive electrode layer and the negative electrode layer, in which the first external electrode covers the first end surface and covers a side of the first end surface of the peripheral surface of the battery element body via the protective layer, the second external electrode covers the second end surface and covers a side of the second end surface of the peripheral surface of the battery element body via the protective layer, and at least one of the first principal surface and the second principal surface include a pair of a first convex part and a second convex part, each of which extend from the first external electrode to the second external electrode along a longitudinal direction connecting the first external electrode and the second external electrode and located at opposed end parts of the solid state battery in a transverse direction to the longitudinal direction.

Figure 2:
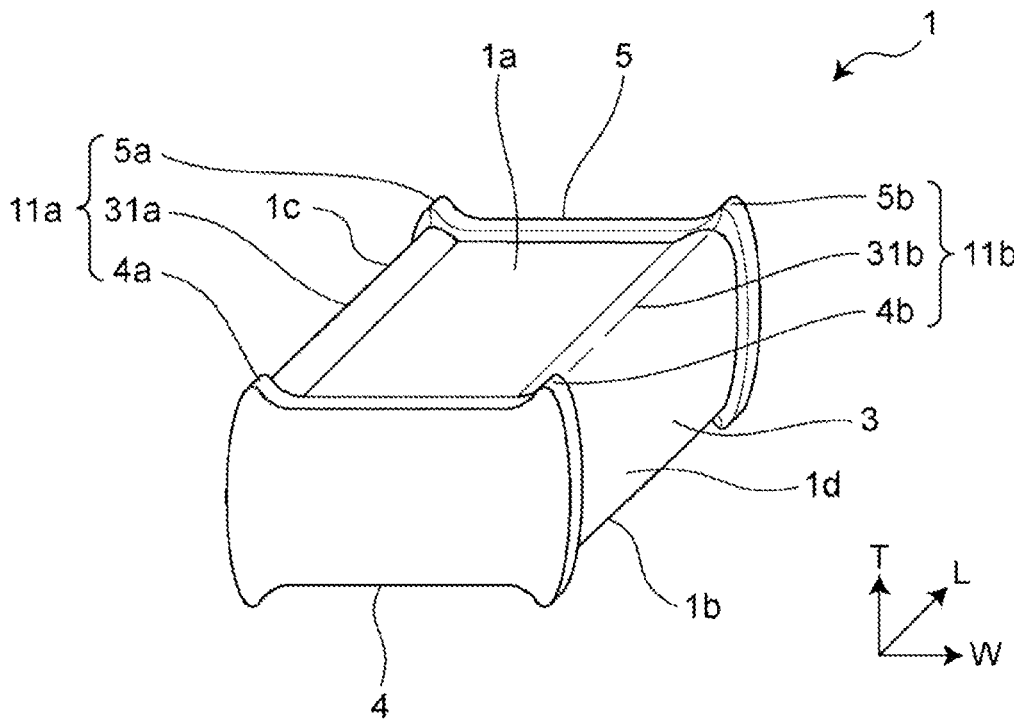
FIG. 2 is a schematic perspective view illustrating an example of a structure of the solid state battery according to the first embodiment of the present invention.
Figure 3:
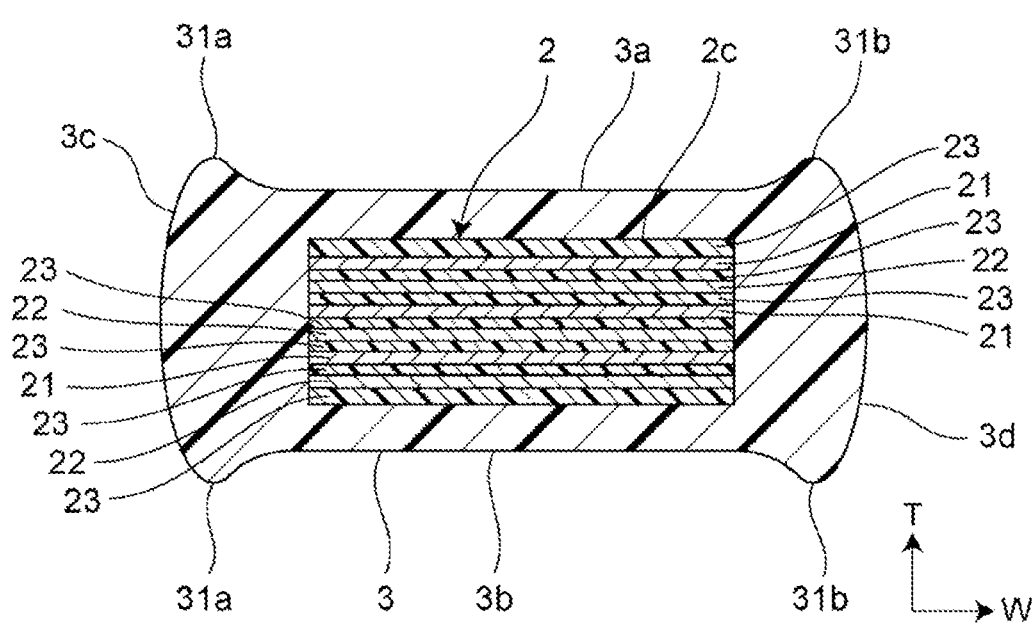
FIG. 3 is a schematic longitudinal sectional view taken along line III-III' in FIG. 1.
Figure 4:
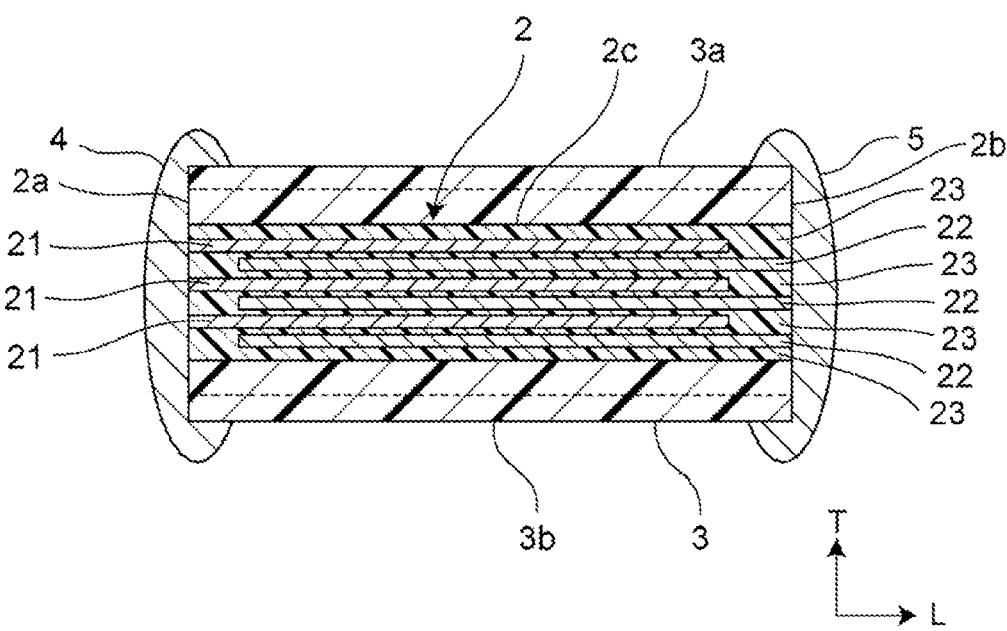
FIG. 4 is a schematic longitudinal sectional view taken along line IV-IV' in FIG. 1.

FIG. 1 is a schematic top view illustrating an example of a structure of a solid state battery 1 according to the present embodiment, FIG. 2 is a schematic perspective view of the solid state battery 1, FIG. 3 is a schematic longitudinal sectional view taken along line III-III' in FIG. 1, and FIG. 4 is a schematic longitudinal sectional view taken along line IV-IV' in FIG. 1.

As illustrated in FIG. 1, a solid state battery 1 includes a battery element body 2 having a first end surface 2*a* and a second end surface 2*b* facing each other and a peripheral surface 2*c* disposed between the first end surface 2*a* and the second end surface 2*b*, a first external electrode 4 provided on the first end surface 2*a*, a second external electrode 5 provided on the second end surface 2*b*, and a protective layer 3 covering the peripheral surface 2*c* of the battery element body 2.

The battery element body 2 has a laminate structure including at least one battery constituent unit including a positive electrode layer 21, a negative electrode layer 22, and a solid electrolyte layer 23 interposed therebetween along a lamination direction, and is formed in a substantially rectangular parallelepiped shape. The battery element body 2 has the first end surface 2*a* and the second end surface 2*b* facing each other, and the peripheral surface 2*c* disposed between the first end surface 2*a* and the second end surface 2*b*. Note that the peripheral surface 2*c* includes a first side surface, a second side surface, a third side surface, and a fourth side surface (none of which are illustrated), the first side surface and the second side surface are positioned to face each other in a lamination direction (for example, a T direction in FIG. 2) of the positive electrode layer and the negative electrode layer, and the third side surface and the fourth side surface are positioned to face each other in, for example, a W direction in FIG. 2. As illustrated in FIG. 4, an end surface of the positive electrode layer 21 is exposed on the first end surface 2*a*, and an end surface of the negative electrode layer 22 is exposed on the second end surface 2*b*. Then, the peripheral surface 2*c* of the battery element body 2 is covered with the protective layer 3. Note that corners and ridges of the battery element body 2 may be chamfered.

The solid state battery 1 includes a first principal surface 1*a* and a second principal surface 1*b* facing each other in the lamination direction of the positive electrode layer and the negative electrode layer, and a first side surface 1*c* and a second side surface 1*d* facing each other in the width direction of the solid state battery 1. Each of the first principal surface 1*a* and the second principal surface 1*b* is provided with a pair of first convex part 11*a* and second convex part 11*b* extending from the first external electrode 4 to the second external electrode 5 along a longitudinal direction connecting the first external electrode 4 and the second external electrode 5 and positioned at both end parts in the transverse direction. The first convex part 11*a* includes a convex part 31*a* formed on the protective layer 3, and a convex part 4*a* of the first external electrode 4 and a convex part 5*a* of the second external electrode 5 located at both end parts in the longitudinal direction of the convex part 31*a*. Furthermore, the second convex part 11*b* includes a convex part 31*b* formed on the protective layer 3, and a convex part 4*b* of the first external electrode 4 and a convex part 5*b* of the second external electrode 5 located at both end parts in the longitudinal direction of the convex part 31*b*.

The convex parts 31*a* and 31*b* formed on the protective layer 3 are provided at an edge part along a long side of the solid state battery 1, and protrude from the first principal surface 1*a* or the second principal surface 1*b*. Furthermore, the convex parts 4*a* and 4*b* of the first external electrode 4 and the convex parts 5*a* and 5*b* of the second external electrode 5 are provided at apex parts of the solid state battery 1, and protrude from the first principal surface 1*a* or the second principal surface 1*b*.

Here, the shape of the convex parts is not particularly limited, and examples thereof include a rectangular shape, an arc shape, a curved shape, a triangular shape, and the like in a sectional view in the transverse direction. Furthermore, as described later, in the transverse direction, one or more intermediate convex parts may be provided between the pair of first convex part 11*a* and second convex part 11*b* located at both end parts in the transverse direction. Note that, in the figure, T represents the height direction of the solid state battery A, L represents the length direction of the solid state battery A, and W represents the width direction of the solid state battery A. In the present embodiment, the longitudinal direction connecting the first external electrode 4 and the second external electrode 5 corresponds to the length direction of the solid state battery A, the transverse direction corresponds to the width direction of the solid state battery A, and the lamination direction of the positive electrode layer and the negative electrode layer corresponds to the height direction.

The first external electrode 4 covers the first end surface 2*a* of the battery element body 2, and covers a side of the first end surface 2*a* of the peripheral surface 2*c* of the battery element body 2 via the protective layer 3 and is electrically connected to the positive electrode layer 21. For example, as illustrated in FIG. 4, the first external electrode 4 can be provided so as to cover a whole circumference of the peripheral surface 2*c* of the battery element body 2 on the side of the first end surface 2*a* via the protective layer 3, that is, so as to have a U-shaped section. Furthermore, the second external electrode 5 covers the second end surface 2*b* of the battery element body 2, and covers a side of the second end surface 2*b* of the peripheral surface 2*c* of the battery element body 2 via the protective layer 3 and is electrically connected to the negative electrode layer 22. For example, as illustrated in FIG. 4, the second external electrode 5 can be provided so as to cover a whole circumference of the peripheral surface 2*c* of the battery element body 2 on the side of the second end surface 2*b* via the protective layer 3, that is, so as to have a U-shaped section.

Figure 5:
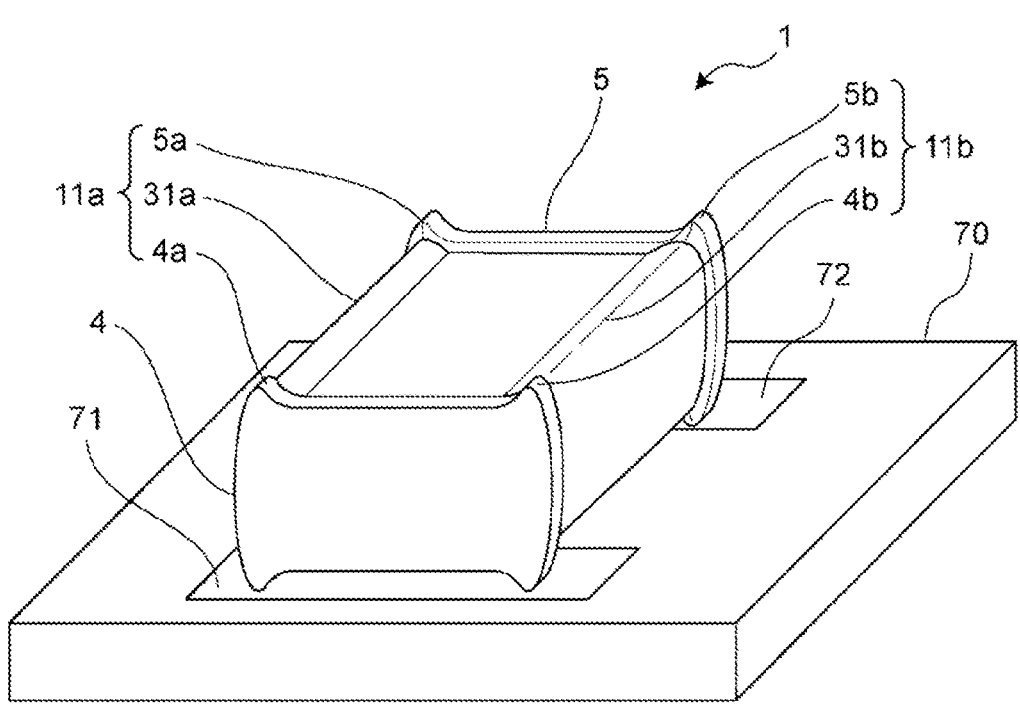
FIG. 5 is a schematic diagram for explaining the effect of the solid state battery according to the first embodiment of the present invention.

Hereinafter, effects of the present invention will be described. FIG. 5 is a schematic perspective view illustrating a state where the solid state battery 1 is mounted on a board 70. Solder is printed on pads 71 and 72 of the board 70, and the solid state battery 1 is mounted. In the present invention, since the first external electrode 4 and the second external electrode 5 of the solid state battery 1 can be brought into direct contact with the pads 71 and 72, the solder printing amount for ensuring electrical connection between the pads 71 and 72 and the first external electrode 4 and the second external electrode 5 can be reduced. As a result, it is possible to reduce the possibility of occurrence of a short circuit between the adjacent mounting components, and high-density mounting becomes possible. Note that, when the solder printing amount is reduced, the self-alignment property may be deteriorated, but in the present invention, surface areas of the first external electrode and the second external electrode can be increased without increasing a width of the solid state battery 1. Accordingly, since the surface tension of the molten solder can be increased, it is possible to suppress a decrease in self-alignment property. Note that the self-alignment property means that a position of the mounting component is adjusted by the surface tension of the molten solder.

Figure 6:
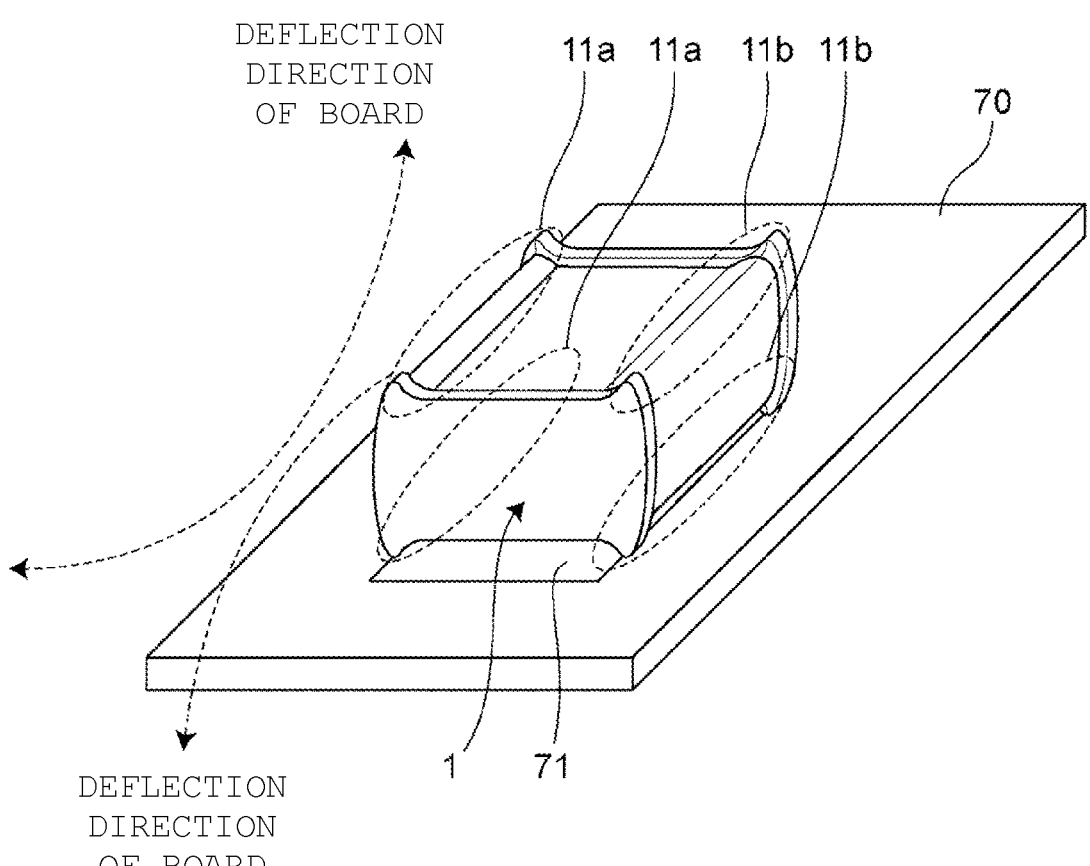
FIG. 6 is a schematic diagram for explaining the effect of the solid state battery according to the first embodiment of the present invention.

Furthermore, FIG. 6 is another schematic perspective view illustrating a state where the solid state battery 1 is mounted on the board 70. When the board deflects due to an external force and warps in a deflection direction, the solid state battery 1 has the first convex part and the second convex part at both end parts in the width direction of the first principal surface and the second principal surface, so that the occurrence of the crack of the solid state battery 1 can be suppressed by these four convex parts stretching, whereby the mechanical strength of the solid state battery 1 can be improved.

Figure 7:
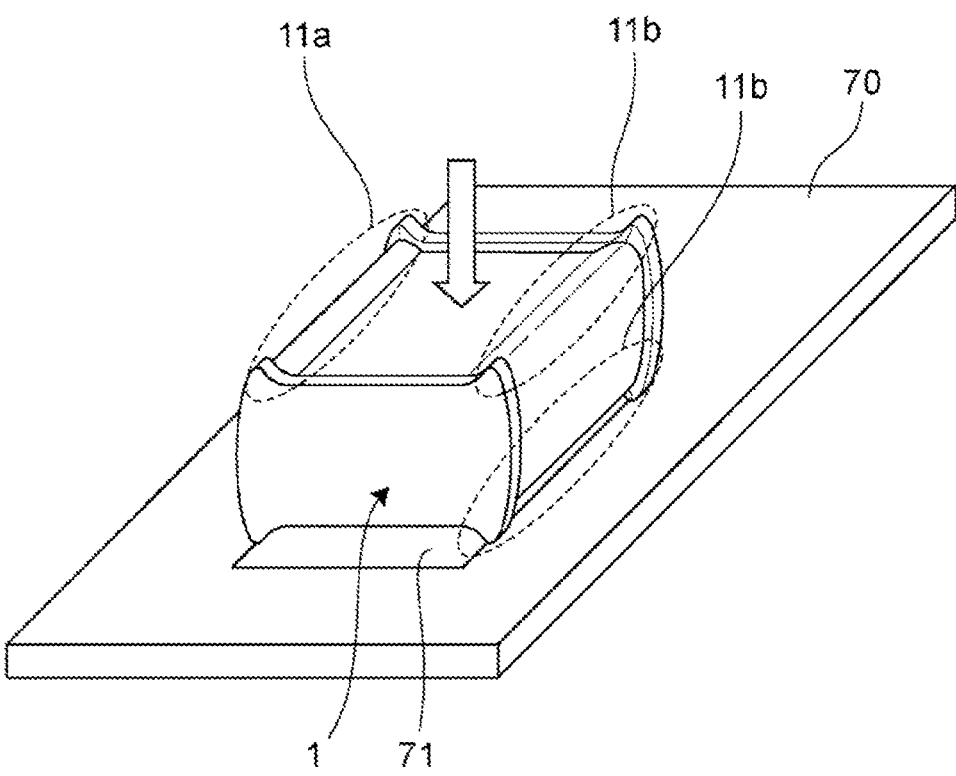
FIG. 7 is a schematic diagram for explaining the effect of the solid state battery according to the first embodiment of the present invention.

Furthermore, FIG. 7 is another schematic perspective view illustrating a state where the solid state battery 1 is mounted on the board 70. When mounting is performed using a mounter, stress tends to concentrate on a specific part as indicated by an arrow, and a crack may occur in the solid state battery 1. In such a case, generation of cracks in the solid state battery 1 can be suppressed by these four convex parts being stretched, so that the mechanical strength of the solid state battery 1 can be improved. In particular, by using a curved shape as the sectional view shape of the convex part, the concentration of the stress can be easily alleviated. The term "curved" as used in the present specification means a shape protruding in the lamination direction with respect to the first principal surface 1$a$ or the second principal surface 1$b$ and having rounded corners. With such a shape, the concentration of the stress can be easily alleviated appropriately.

Furthermore, as described later, from the viewpoint of manufacturing the solid state battery (from the viewpoint of dipping a protective layer paste), a first side surface 3$c$ and a second side surface 3$d$ facing each other in the transverse direction (W direction) of the solid state battery may be a curved surface (see FIG. 3). The term "curved surface" as used in the present specification refers to a rounded shape that is not perpendicular (90°) to the first principal surface 1$a$ or the second principal surface 1$b$. With such a shape, in a case where the stress as indicated by the arrow in FIG. 7 concentrates on a specific part, since the first side surface and the second side surface are curved surfaces, the concentration of the stress can be easily alleviated appropriately.

Furthermore, regarding a degree of curvature of the convex parts 11$a$ and 11$b$, the degree of curvature of the convex part 11$a$ and the degree of curvature of the convex part 11$b$ may be different. When the shape of the solid state battery is asymmetric on left and right sides as described above, the left and right sides of the solid state battery can be specified when the solid state battery is mounted, and the solid state battery can be prevented from being mounted in an incorrect direction.

Hereinafter, a material used for the solid state battery of the present invention will be described.

In the solid state battery, each layer constituting the solid state battery is formed by firing, and the positive electrode layer, the negative electrode layer, the solid electrolyte layer, and the like may constitute a sintered layer. Preferably, the positive electrode layer, the negative electrode layer, and the solid electrolyte layer are integrally fired with each other, and therefore the solid state battery laminate may constitute an integrally fired body.

(Positive Electrode Layer and Negative Electrode Layer)

The positive electrode layer is an electrode layer containing at least a positive electrode active material. The positive electrode layer may further contain a solid electrolyte. For example, the positive electrode layer may be composed of a fired body containing at least positive electrode active material particles and solid electrolyte particles. In a preferred aspect, the positive electrode layer may be composed of a fired body substantially containing only positive electrode active material particles and solid electrolyte particles. On the other hand, the negative electrode layer is an electrode layer containing at least a negative electrode active material. The negative electrode layer may further contain a solid electrolyte. For example, the negative electrode layer may be composed of a fired body containing at least negative electrode active material particles and solid electrolyte particles. In a preferred aspect, the negative electrode layer may be composed of a fired body substantially containing only negative electrode active material particles and solid electrolyte particles.

The positive electrode active material and the negative electrode active material are substances involved in the transfer of electrons in the solid state battery. Ions move (are conducted) between the positive electrode layer and the negative electrode layer via the solid electrolyte, and electrons are transferred, whereby charging and discharging are performed. The positive electrode layer and the negative electrode layer are preferably layers capable of occluding and releasing sodium ions or lithium ions, preferably lithium ions as ions. That is, the solid state battery is preferably an all-solid state secondary battery in which sodium ions or lithium ions move between the positive electrode layer and the negative electrode layer via the solid electrolyte to charge and discharge the battery.

(Positive Electrode Active Material)

Examples of the positive electrode active material capable of occluding and releasing lithium ions include at least one selected from the group consisting of a lithium-containing phosphate compound having a NASICON-type structure, a lithium-containing phosphate compound having an olivine-type structure, a lithium-containing layered oxide, a lithium-containing oxide having a spinel-type structure, and the like. Examples of the lithium-containing phosphate compound having a NASICON-type structure include $Li_3V_2(PO_4)_3$. Examples of the lithium-containing phosphate compound having an olivine-type structure include $LiFePO_4$ and/or $LiMnPO_4$. Examples of the lithium-containing layered oxide include $LiCoO_2$ and/or $LiCo_{1/3}Ni_{1/3}Mn_{1/3}O_2$. Examples of the lithium-containing oxide having a spinel-type structure include $LiMn_2O_4$ and/or $LiNi_{0.5}Mn_{1.5}O_4$.

Furthermore, examples of the positive electrode active material capable of occluding and releasing sodium ions include at least one selected from the group consisting of a sodium-containing phosphate compound having a NASICON-type structure, a sodium-containing phosphate compound having an olivine-type structure, a sodium-containing layered oxide, a sodium-containing oxide having a spinel-type structure, and the like. For example, in the case of a sodium-containing phosphate compound, at least one selected from the group consisting of $Na_3V_2(PO_4)_3$, $NaCoFe_2(PO_4)_3$, $Na_2Ni_2Fe(PO_4)_3$, $Na_3Fe_2(PO_4)_3$, $Na_2FeP_2O_7$, $Na_4Fe_3(PO_4)_2(P_2O_7)$, and $NaFeO_2$ as a sodium-containing layered oxide can be mentioned.

In addition, the positive electrode active material may be, for example, an oxide, a disulfide, a chalcogenide, a conductive polymer, or the like. The oxide may be, for example, titanium oxide, vanadium oxide, manganese dioxide, or the like. The disulfide is, for example, titanium disulfide or molybdenum sulfide. The chalcogenide may be, for example, niobium selenide. The conductive polymer may be, for example, disulfide, polypyrrole, polyaniline, polythiophene, polypara-styrene, polyacetylene, or polyacene.

(Negative Electrode Active Material)

Examples of the negative electrode active material capable of occluding and releasing lithium ions include at least one selected from the group consisting of an oxide containing at least one element selected from the group consisting of Ti, Si, Sn, Cr, Fe, Nb, and Mo, a carbon material such as graphite, a graphite-lithium compound, a lithium alloy, a lithium-containing phosphate compound having a NASICON-type structure, a lithium-containing phosphate compound having an olivine-type structure, and a lithium-containing oxide having a spinel-type structure. Examples of the lithium alloy include Li—Al. Examples of the lithium-containing phosphate compound having a NASI-CON-type structure include $Li_3V_2(PO_4)_3$ and/or $LiTi_2$ $(PO_4)_3$. Examples of the lithium-containing phosphate compound having an olivine-type structure include $Li_3Fe_2$ $(PO_4)_3$ and/or $LiCuPO_4$. Examples of the lithium-containing oxide having a spinel-type structure include $Li_4Ti_5O_{12}$.

Furthermore, examples of the negative electrode active material capable of occluding and releasing sodium ions include at least one selected from the group consisting of a sodium-containing phosphate compound having a NASI-CON-type structure, a sodium-containing phosphate compound having an olivine-type structure, a sodium-containing oxide having a spinel-type structure, and the like.

The positive electrode layer and/or the negative electrode layer may contain a conductive material. Examples of the conductive material contained in the positive electrode layer and the negative electrode layer include at least one kind of metal materials such as silver, palladium, gold, platinum, aluminum, copper, and nickel, and carbon, and the like.

Moreover, the positive electrode layer and/or the negative electrode layer may contain a conductive material. Examples of the conductive material include at least one selected from the group consisting of lithium oxide, sodium oxide, potassium oxide, boron oxide, silicon oxide, bismuth oxide, and phosphorus oxide.

Thicknesses of the positive electrode layer and the negative electrode layer are not particularly limited, and may be, for example, 2 µm to 50 µm, particularly 5 µm to 30 µm, independently of each other.

(Solid Electrolyte Layer)

The solid electrolyte is a substance capable of conducting sodium ions or lithium ions. In particular, the solid electrolyte layer constituting a battery constituent unit in the solid state battery forms a layer capable of conducting sodium ions or lithium ions between the positive electrode layer and the negative electrode layer. Note that the solid electrolyte may be provided at least between the positive electrode layer and the negative electrode layer. That is, the solid electrolyte may also exist around the positive electrode layer and/or the negative electrode layer so as to protrude from between the positive electrode layer and the negative electrode layer. Examples of the solid electrolyte capable of conducting lithium ions include lithium-containing polyanionic compounds having a NASICON structure, oxides having a perovskite structure, oxides having a garnet-type or garnet-type similar structure, oxide glass ceramic-based lithium ion conductors, and the like. Examples of the lithium-containing polyanionic compound having a NASICON structure include $Li_xM_y(PO_4)_3$ (1≤x≤2, 1≤y≤2, and M is at least one selected from the group consisting of Ti, Ge, Al, Ga, and Zr.), which is a lithium-containing phosphate compound. Examples of the lithium-containing phosphate compound having a NASICON structure include $Li_{1.2}Al_{0.2}Ti_{1.8}(PO_4)_3$. Examples of the oxide having a perovskite structure include $La_{0.55}Li_{0.35}TiO_3$. Examples of the oxide having a garnet-type or garnet-type similar structure include $Li_7La_3Zr_2O_{12}$. As the oxide glass ceramic-based lithium ion conductor, for example, a phosphate compound (LATP) containing lithium, aluminum, and titanium as constituent elements, and a phosphate compound (LAGP) containing lithium, aluminum, and germanium as constituent elements can be used. Furthermore, examples of the solid electrolyte capable of conducting sodium ions include a sodium-containing phosphate compound having a NASICON structure, an oxide having a perovskite structure, and an oxide having a garnet-type or garnet-type similar structure. Examples of the sodium-containing phosphate compound having a NASI-CON structure include $Na_xM_y(PO_4)_3$ (1≤x≤4, 1≤y≤2, M is at least one selected from the group consisting of Zr and Ti, Ge, Al, Ga, Fe, and the like, and a part of P may be substituted with Si, S, or the like.).

The solid electrolyte may contain a conductive material. The conductive material contained in the solid electrolyte may be selected from, for example, materials similar to the conductive material that can be contained in the positive electrode layer and/or the negative electrode layer.

A thickness of the solid electrolyte layer is not particularly limited, and may be, for example, 1 µm to 15 µm, particularly 1 µm to 5 µm.

(Protective Layer)

The protective layer is generally formed on an outermost side of the solid state battery, and is intended for electrical, physical, and/or chemical protection. The protective layer contains a ceramic powder and an inorganic binder. The ceramic contains at least one of a metal oxide, a metal nitride, and a metal carbide. Here, the metal is defined to include a semimetal. For example, the ceramic contains at least one of $Al_2O_3$ (aluminum oxide:alumina), $SiO_2$ (silicon oxide:quartz), SiN (silicon nitride), AlN (aluminum nitride), and SiC (silicon carbide). The inorganic binder preferably contains a lithium-containing phosphate compound. The lithium-containing phosphate compound is preferably fired. The lithium-containing phosphate compound is preferably the same as the lithium-containing phosphate compound contained in the solid electrolyte layer. However, the components or compositions of the lithium-containing phosphate compound contained in an exterior material and the solid electrolyte layer may be the same or different.

Furthermore, it is preferable that the protective layer is formed by integrally firing the peripheral surface of the battery element body and the fired body. Here, the peripheral surface of the battery element body on which the protective layer is integrally fired is a side surface excluding an uppermost layer and a lowermost layer of the battery element body, and the first end surface and the second end surface on which the first external electrode and the second external electrode are formed. The uppermost layer and the lowermost layer of the battery element body may be the positive electrode layer or the negative electrode layer, or a connection layer joined to the protective layer may be provided. When the connection layer is joined to the protective layer, integration of the battery element body and the protective layer is facilitated. A solid electrolyte layer containing a polyanionic compound is preferably used for the connection layer. Here, examples of the solid electrolyte containing a polyanionic compound include a lithium-containing phosphate compound as a lithium ion conductor and a sodium-containing phosphate compound as a sodium ion conductor.

Furthermore, from the viewpoint of integral firing, the positive electrode layer, the negative electrode layer, and the solid electrolyte layer constituting the battery element body may contain at least one common element. As such an example, the positive electrode layer may contain $Al_2O_3$, $SiO_2$, MgO, or the like in addition to the positive electrode active material and the solid electrolyte, the negative electrode layer may contain $Al_2O_3$, $SiO_2$, MgO, or the like in addition to the negative electrode active material and the solid electrolyte, and the solid electrolyte layer may contain $Al_2O_3$, $SiO_2$, MgO, or the like in addition to the solid electrolyte.

Furthermore, from the viewpoint of securing the water vapor barrier property and the mechanical strength, the protective layer has an average thickness of 1 μm to 500 μm, and preferably 5 μm to 100 μm. Here, as the average thickness of the protective layer, an average thickness calculated from the thicknesses of 100 points of an upper surface part, a lower surface part, and a side surface part of the protective layer is used.

(External Electrode)

A solid state battery is generally provided with a terminal (external electrode). In particular, a positive electrode terminal (corresponding to the first external electrode) and a negative electrode terminal (corresponding to the second external electrode) are provided on the first end surface and the second end surface located on opposite sides of the battery element body. More specifically, a positive electrode terminal connected to the positive electrode layer and a negative electrode terminal connected to the negative electrode layer are provided. As such a terminal, it is preferable to use a material having high conductivity. The material of the external electrode is not particularly limited, but may be at least one selected from the group consisting of silver, gold, platinum, aluminum, copper, tin, and nickel.

[Method of Manufacturing Solid State Battery]

Hereinafter, a method of manufacturing the solid state battery according to the first embodiment of the present invention will be described.

The solid state battery according to the first embodiment can be manufactured by combining a green sheet method using a green sheet, a printing method such as a screen printing method, and a dipping method. In one aspect, a solid electrolyte layer is formed by the green sheet method, a positive electrode layer and a negative electrode layer are formed by the screen printing, and a protective layer is provided on the peripheral surface of the laminated body by the dipping method, whereby a solid state battery can be manufactured. Note that, hereinafter, the description will be given on the premise of this aspect, but the present invention is not limited thereto, and a predetermined laminate may be formed by the green sheet method or the screen printing method.

(Step of Forming Unfired Laminate)

First, a paste of the solid electrolyte layer is applied onto a substrate (for example, a PET film). Furthermore, a paste for the positive electrode layer, a paste for the negative electrode layer, a paste for an electrode separation part, and a paste for the exterior material are prepared.

Each paste can be prepared by wet-mixing a predetermined constituent material of each layer appropriately selected from the group consisting of a positive electrode active material, a negative electrode active material, a conductive material, a solid electrolyte material, an insulating material, and a conductive material with an organic vehicle in which an organic material is dissolved in a solvent. The paste for the positive electrode layer contains a positive electrode active material, a conductive material, a solid electrolyte material, an organic material, and a solvent. The paste of the negative electrode layer contains a negative electrode active material, a conductive material, a solid electrolyte material, an organic material, and a solvent. The paste of the solid electrolyte layer contains a solid electrolyte material, a conductive material, an organic material, and a solvent. The paste of the electrode separation part contains an insulating material (for example, a solid electrolyte material), a conductive material, an organic material, and a solvent. The paste of the protective layer contains a glassy material, a crystalline material, an organic material, and a solvent.

In the wet mixing, a medium can be used, and specifically, a ball mill method, a viscomill method, or the like can be used. On the other hand, a wet mixing method without using a medium may be used, and a Sandoz mill method, a high-pressure homogenizer method, a kneader dispersion method, or the like may be used.

A supporting substrate is not particularly limited as long as it can support the unfired laminate, and for example, a substrate including a polymer material such as polyethylene terephthalate can be used. When the unfired laminate is subjected to the firing step while being held on the substrate, a substrate having heat resistance to a firing temperature may be used.

As the solid electrolyte material contained in the paste for the solid electrolyte layer, a powder composed of a lithium-containing phosphate compound having a NASICON structure, an oxide having a perovskite structure, and/or an oxide having a garnet-type or garnet-type similar structure as described above may be used.

As the positive electrode active material contained in the paste for the positive electrode layer, for example, at least one selected from the group consisting of a lithium-containing phosphate compound having a NASICON-type structure, a lithium-containing phosphate compound having an olivine-type structure, a lithium-containing layered oxide, a lithium-containing oxide having a spinel-type structure, and the like may be used.

As the negative electrode active material contained in the paste for the negative electrode layer, for example, a negative electrode active material selected from at least one selected from the group consisting of an oxide containing at least one element selected from the group consisting of Ti, Si, Sn, Cr, Fe, Nb, and Mo, a lithium-containing phosphate compound having a NASICON-type structure, a lithium-containing phosphate compound having an olivine-type structure, a lithium-containing oxide having a spinel-type structure, and the like, a material contained in the solid electrolyte paste, a conductive material, and the like may be used.

The organic material contained in the paste is not particularly limited, but at least one polymer material selected from the group consisting of a polyvinyl acetal resin, a cellulose resin, a polyacrylic resin, a polyurethane resin, a polyvinyl acetate resin, a polyvinyl alcohol resin, and the like can be used. The solvent is not particularly limited as long as the organic material can be dissolved, and for example, toluene and/or ethanol may be used.

As the conductive material, at least one selected from the group consisting of lithium oxide, sodium oxide, potassium oxide, boron oxide, silicon oxide, bismuth oxide, and phosphorus oxide may be used.

The applied paste is dried on a hot plate heated to 30° C. or higher and 50° C. or lower to form a solid electrolyte layer sheet having a predetermined thickness on the substrate (for example, a PET film).

(Laminating Step of Battery Element Body)

The solid electrolyte layer sheet is peeled off from the substrate. A positive electrode layer is formed on the solid electrolyte layer sheet by the screen printing, and an electrode separation part is formed around the positive electrode layer by the screen printing to prepare a positive electrode layer-integrated solid electrolyte layer sheet. Furthermore, a negative electrode layer is formed on the solid electrolyte layer sheet by the screen printing, and an electrode separation part is formed around the negative electrode layer by the screen printing to prepare a negative electrode layer-integrated solid electrolyte sheet. The positive electrode layer-integrated solid electrolyte layer sheet and the negative electrode layer-integrated solid electrolyte sheet are alternately laminated with the solid electrolyte layer interposed therebetween to obtain a battery element body in which the solid electrolyte layer is disposed as a connection layer on the uppermost layer and the lowermost layer. Subsequently, it is preferable to perform thermo-pressure bonding at a predetermined pressure (for example, about 50 to about 100 MPa) and subsequent isotropic pressing at a predetermined pressure (for example, about 150 to about 300 MPa). As described above, a predetermined battery element body can be manufactured.

Next, the peripheral surface of the battery element body is dipped in the paste for the protective layer to form a protective layer. First, the protective layer is formed on the first side surface and the second side surface by dipping the upper surface of the uppermost layer (corresponding to the first side surface described above) and the lower surface of the lowermost layer (corresponding to the second side surface described above) of the battery element body into the paste for the protective layer. Next, the protective layer is formed by dipping the paste for the protective layer on the third side surface and the fourth side surface of the battery element body where the end surfaces of the positive electrode layer and the negative electrode layer are not exposed, and at this time, the paste for the protective layer is dipped so as to form convex parts on the third side surface and the fourth side surface. Examples of the method of forming the convex parts on the third side surface and the fourth side surface include a method of dipping the third side surface and the fourth side surface into the paste for the protective layer a plurality of times. By dipping the paste for the protective layer on the third side surface and the fourth side surface a plurality of times in this manner, the first side surface and the second side surface become curved surfaces as illustrated in FIG. 3. Note that, instead of dipping a plurality of times, a method of dipping with a paste for the protective layer having high viscosity can also be used. Alternatively, the screen printing method can also be used. For example, a protective layer sheet is prepared by the same method as described in the preceding paragraph, and a paste for the protective layer is applied by the screen printing to a part on which a convex part is to be formed to form the convex part. Next, the battery element body is sandwiched and laminated such that the protective layer sheet on which the convex part is formed is positioned at the uppermost layer and the lowermost layer.

(Firing Step)

In the firing step, the unfired laminate is fired. Although it is merely an example, the firing is performed by removing the organic material in a nitrogen gas atmosphere containing oxygen gas or in the atmosphere, for example, at 500° C., and then heating the organic material in a nitrogen gas atmosphere or in the atmosphere, for example, at 550° C. to 1000° C. The firing may be performed while pressurizing the unfired laminate in the lamination direction (in some cases, the lamination direction and a direction perpendicular to the lamination direction). Note that the firing may be performed at one time after providing the protective layer on the battery element body (simultaneous firing), or may be performed after firing the battery element body, providing the protective layer, and further performing firing (sequential firing).

Next, an external electrode is attached to the obtained laminate. The first external electrode is provided to be electrically connectable to the positive electrode layer, and the second external electrode is provided to be electrically connectable to the negative electrode layer. Here, the first external electrode is provided so as to cover the first end surface of the battery element body and cover the side of the first end surface of the peripheral surface of the battery element body via the protective layer. This makes it possible to obtain the first external electrode having convex parts at four corners. Furthermore, the second external electrode is provided so as to cover the second end surface of the battery element body and cover the side of the second end surface of the peripheral surface of the battery element body via the protective layer. This makes it possible to obtain a second external electrode having convex parts at four corners. For example, it is preferable to form an external electrode by dipping into a metal paste or the like. The number of times of dipping is not particularly limited, but it is preferably two or more times. Furthermore, although not particularly limited, the external electrode is preferably composed of at least one selected from silver, gold, platinum, aluminum, copper, tin, and nickel.

Note that, in the above manufacturing method, the case where the solid state battery is a lithium ion secondary battery has been described, but a solid state battery which is a sodium ion secondary battery can also be manufactured by using a negative electrode active material or a positive electrode active material capable of occluding and releasing sodium ions and a solid electrolyte capable of conducting sodium ions.

Second Embodiment

The present embodiment relates to an electronic device including an elongated board and the solid state battery according to the first embodiment mounted on the board, in which a longitudinal direction of the board and a longitudinal direction connecting a first external electrode and a second external electrode of the solid state battery coincide with each other.

Figure 8:
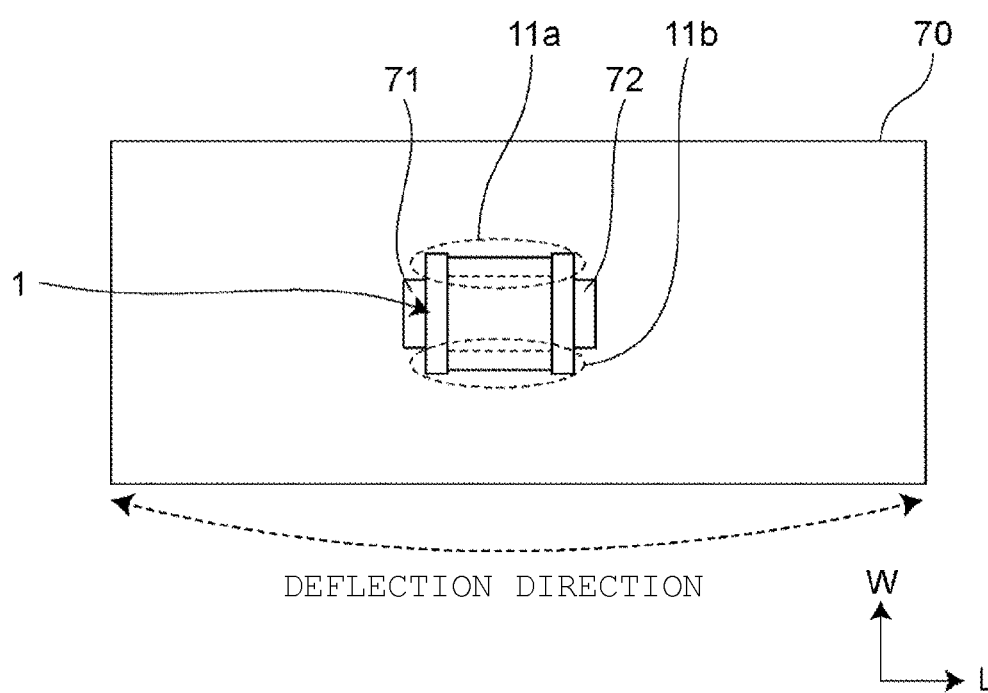
FIG. 8 is a schematic top view illustrating an example of a structure of a solid state battery according to a second embodiment of the present invention.

FIG. 8 is a schematic top view illustrating an example of the configuration of the electronic device according to the present embodiment. A solid state battery 1 is mounted on an elongated board 70. In the present embodiment, a longitudinal direction connecting a first external electrode 4 and a second external electrode 5 of the solid state battery 1 coincides with a longitudinal direction of the elongated board 70. In general, in the case of the elongated board 70, the elongated board easily deflects by an external force in the longitudinal direction and easily warps, whereas the elongated board hardly deflects in the transverse direction. Since the solid state battery 1 has a first convex part and a second convex part extending in the longitudinal direction connecting the first external electrode 4 and the second external electrode 5 on a first principal surface and a second principal surface facing each other, four convex parts stretch, so that the occurrence of cracks in the solid state battery 1 can be suppressed. As a result, the mechanical strength of the solid state battery 1 can be improved.

The board is not particularly limited as long as it has an elongated shape, and examples thereof include a printed circuit board. The printed circuit board is generally made of paper or glass cloth as a substrate, and hardly deflects in a fiber direction (corresponding to the longitudinal direction), and hardly warps. Therefore, by using a printed circuit board as the board and matching the fiber direction with the longitudinal direction connecting the first external electrode and the second external electrode of the solid state battery, the occurrence of cracks in the solid state battery can be further suppressed.

The electronic device is not particularly limited as long as the electronic device mounts the solid state battery, and examples thereof include a power device, an IoT device, a wearable device, and a real-time clock (RTC).

Although the embodiments of the present invention have been described above, only typical examples have been illustrated. Therefore, those skilled in the art will easily understand that the present invention is not limited thereto, and various aspects are conceivable without changing the gist of the present invention.

For example, in the first embodiment, the solid state battery 1 in which the pair of first convex part and second convex part located at both end parts in the transverse direction are provided as the convex parts has been described, but one or more intermediate convex parts may be provided between the pair of first convex part and second convex part in the transverse direction, and the shape of the convex parts can also take a rectangular shape, an arc shape, a curved shape, a triangular shape, or the like in the sectional view in the transverse direction.

Figure 9:
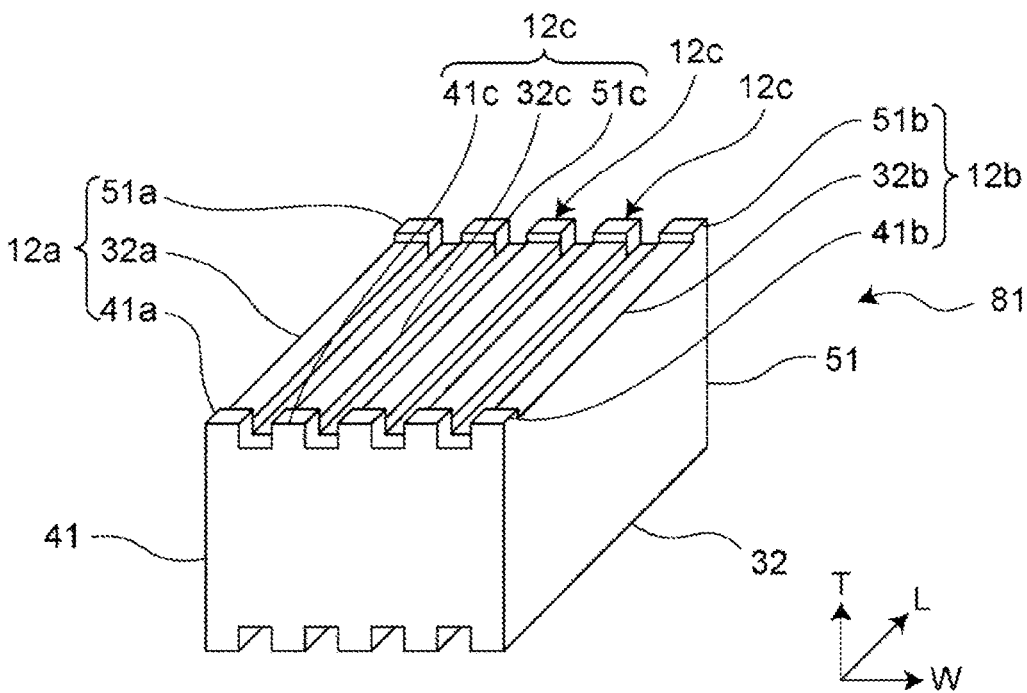
FIG. 9 is a schematic perspective view illustrating another example of the solid state battery according to the first embodiment of the present invention.
Figure 10:
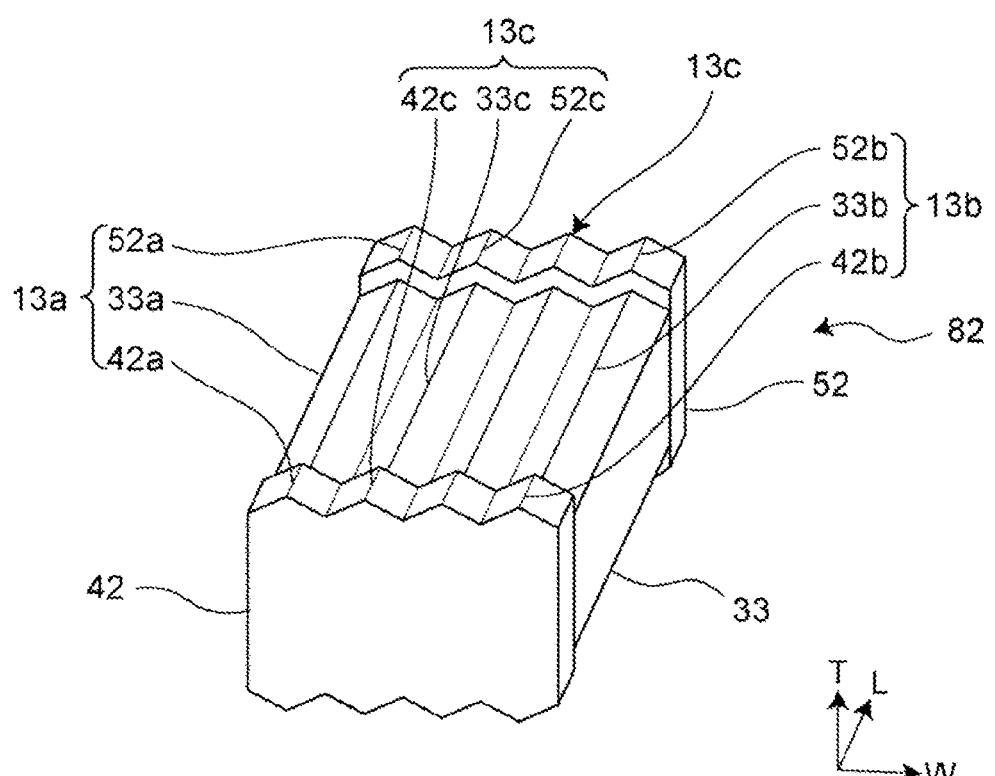
FIG. 10 is a schematic perspective view illustrating another example of the solid state battery according to the first embodiment of the present invention.
Figure 11:
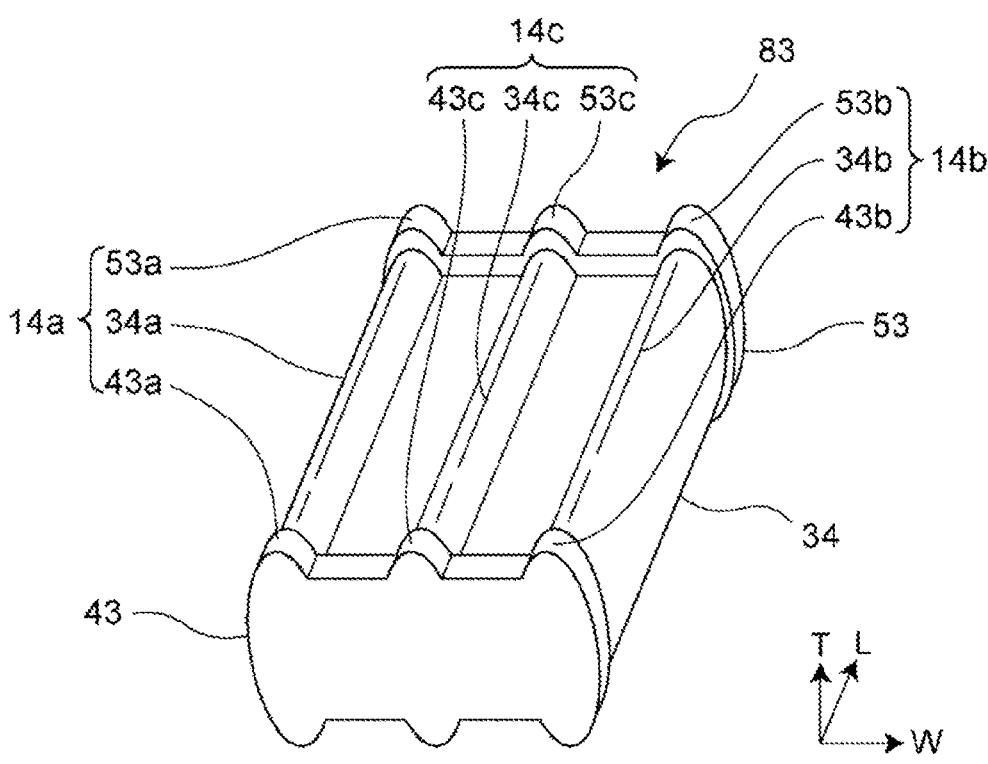
FIG. 11 is a schematic perspective view illustrating another example of the solid state battery according to the first embodiment of the present invention.
Figure 12:
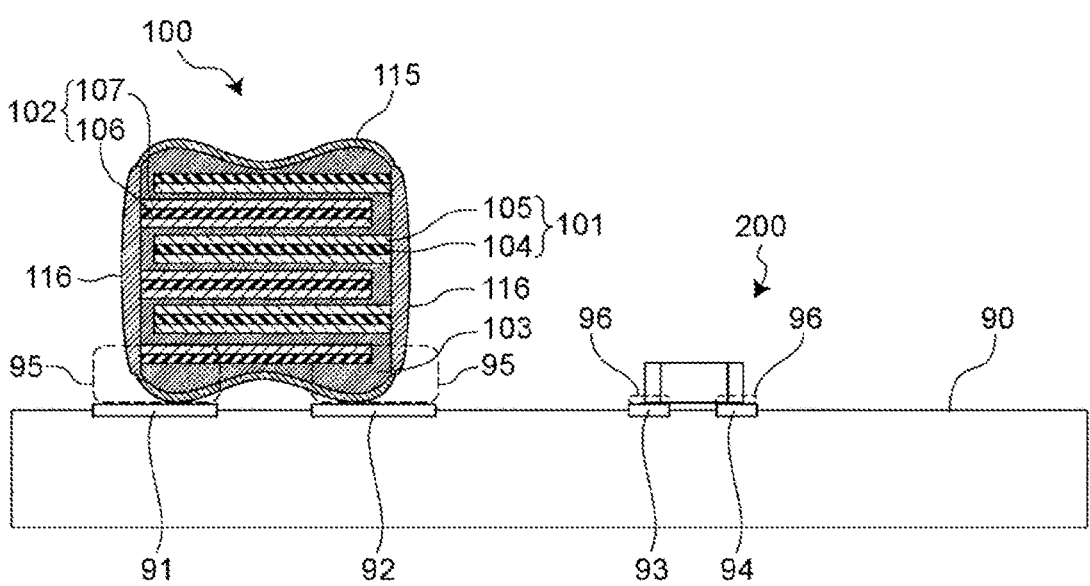
FIG. 12 is a schematic sectional view illustrating an example of a conventional solid state battery.

Each of FIGS. 9 to 11 is a schematic perspective view illustrating an example of a solid state battery provided with one or more intermediate convex parts. A solid state battery 81 illustrated in FIG. 9 is an example in which intermediate convex parts 12c are provided between a pair of first convex part 12a and second convex part 12b, and the convex parts have a rectangular shape in a transverse sectional view. Here, the first convex part 12a includes a convex part 32a formed on a protective layer 32, and a convex part 41a of a first external electrode 41 and a convex part 51a of a second external electrode 51 located at both end parts in the longitudinal direction of the convex part 32a. Furthermore, the second convex parts 12b include a convex parts 32b formed on the protective layer 32, and a convex parts 41b of the first external electrode 41 and a convex parts 51b of the second external electrode 51 located at both end parts in the longitudinal direction of the convex parts 32b. Furthermore, each of the intermediate convex parts 12c includes a convex part 32c formed on the protective layer 32, and a convex part 41c of the first external electrode 41 and a convex part 51c of the second external electrode 51 located at both end parts in the longitudinal direction of the convex part 32c.

Furthermore, a solid state battery 82 illustrated in FIG. 10 is an example in which intermediate convex parts 13c are provided between a pair of first convex part 13a and second convex part 13b, and the convex parts have a triangular shape in a transverse sectional view. Here, the first convex part 13a includes a convex part 33a formed on a protective layer 33, and a convex part 42a of a first external electrode 42 and a convex part 52a of a second external electrode 52 located at both end parts in the longitudinal direction of the convex part 33a. Furthermore, the second convex part 13b includes a convex part 33b formed on the protective layer 33, and a convex part 42b of the first external electrode 42 and a convex part 52b of the second external electrode 52 located at both end parts in the longitudinal direction of the convex parts 33b. Furthermore, each of the intermediate convex parts 13c includes a convex part 33c formed on the protective layer 33, and a convex part 42c of the first external electrode 42 and a convex part 52c of the second external electrode 52 located at both end parts in the longitudinal direction of the convex part 33c.

Furthermore, a solid state battery 83 illustrated in FIG. 11 is an example in which an intermediate convex part 14c is provided between a pair of first convex part 14a and second convex part 14b, and the convex parts have a curved shape in a sectional view in a transverse direction. Here, the first convex part 14a includes a convex part 34a formed on a protective layer 34, and a convex part 43a of a first external electrode 43 and a convex part 53a of a second external electrode 53 located at both end parts in the longitudinal direction of the convex part 34a. Furthermore, the second convex part 14b includes a convex part 34b formed on the protective layer 34, and a convex part 43b of the first external electrode 43 and a convex part 53b of the second external electrode 53 located at both end parts in the longitudinal direction of the convex part 34b. Furthermore, the intermediate convex part 14c includes a convex part 34c formed on the protective layer 34, and a convex part 43c of the first external electrode 43 and a convex part 53c of the second external electrode 53 located at both end parts in the longitudinal direction of the convex part 34c. Note that, in FIGS. 9 to 11, the number of intermediate convex parts is not limited to the illustrated number, and may be one or more.

According to the aspects of the solid state batteries illustrated in FIGS. 9 to 11, by providing one or more intermediate convex parts between the pair of first convex part and second convex part, the surface areas of the first external electrode and the second external electrode can be increased without increasing the width of each of the solid state batteries. As a result, the mounting strength can be further improved, and the surface areas of the first external electrode and the second external electrode can be increased, so that the surface tension of the molten solder can be further increased, and the deterioration of the self-alignment property can be further suppressed. Furthermore, when the board deflects in a deflection direction due to the deflection of the board by the external force, the intermediate convex parts further stretch, so that the occurrence of cracks in the solid state battery can be further suppressed. As a result, the mechanical strength of the solid state battery can be further improved.

The solid state battery according to one embodiment of the present invention can be used in various fields where battery use or power storage is assumed. Although it is merely an example, the solid state battery of the present invention can be used in the fields of electricity, information, and communication in which electricity, electronic device, and the like in which mobile device and the like are used (for example, electric and electronic device fields or mobile device fields including mobile phones, smartphones, note-book computers and digital cameras, activity meters, arm computers, electronic papers, and small electronic machines such as RFID tags, card-type battery money, and smart-watches.), home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a submersible.), and the like.

DESCRIPTION OF REFERENCE SYMBOLS

1: Solid state battery
1a: First principal surface
1b: Second principal surface
1c: First side surface
1d: Second side surface
11a, 12a, 13a, 14a: First convex part
11b, 12b, 13b, 14b: Second convex part
12c, 13c, 14c: Intermediate convex part
2: Battery element body
2a: First end surface
2b: Second end surface
2c: Peripheral surface
3, 32, 33, 34: Protective layer
31a, 32a, 33a, 34a: Convex part of protective layer
31b, 32b, 33b, 34b: Convex part of protective layer
32c, 33c, 34c: Convex part of protective layer
4, 41, 42, 43: First external electrode
4a, 41a, 42a, 43a: Convex part of first external electrode
5, 51, 52, 53: Second external electrode
5a, 51a, 52a, 53a: Convex part of second external electrode
21: Positive electrode layer
22: Negative electrode layer
23: Solid electrolyte layer
70: Board
71, 72: Pad

The invention claimed is:

1. A solid state battery comprising:
a battery element body including a positive electrode layer and a negative electrode layer laminated with a solid electrolyte layer interposed between the positive electrode layer and the negative electrode layer, the battery element body defining a first end surface and a second end surface facing each other, and a peripheral surface between the first end surface and the second end surface;
a first external electrode on the first end surface;
a second external electrode on the second end surface; and
a protective layer covering only the peripheral surface of the battery element body,
the solid state battery defining a first principal surface and a second principal surface facing each other in a lamination direction of the positive electrode layer and the negative electrode layer,
wherein the first external electrode covers the first end surface and covers a side of the first end surface of the peripheral surface of the battery element body via the protective layer,
the second external electrode covers the second end surface and covers a side of the second end surface of the peripheral surface of the battery element body via the protective layer, and
at least one of the first principal surface and the second principal surface include a pair of a first convex part and a second convex part, each of which extend continuously from the first external electrode to the second external electrode along a longitudinal direction connecting the first external electrode and the second external electrode and located at opposed end parts of the solid state battery in a transverse direction to the longitudinal direction.

2. The solid state battery according to claim 1, further comprising one or more third convex parts extending in the longitudinal direction between the first convex part and the second convex part on the at least one of the first principal surface and the second principal surface.

3. The solid state battery according to claim 1, wherein the first convex part or the second convex part includes a convex part on the protective layer, a convex part on the first external electrode, and a convex part on the second external electrode.

4. The solid state battery according to claim 1, wherein the solid state battery further defines a first side surface and a second side surface facing each other in the transverse direction, wherein the first convex part and the second convex part form a part of at least one of the first side surface and the second side surface.

5. The solid state battery according to claim 4, wherein the at least one of the first side surface and the second side surface are curved surfaces.

6. The solid state battery according to claim 1, wherein the first convex part and the second convex part have a curved shape in a sectional view in the transverse direction.

7. The solid state battery according to claim 6, wherein the first convex part has a degree of curvature different from a degree of curvature of the second convex part.

8. The solid state battery according to claim 1, wherein both of the first principal surface and the second principal surface include the pair of the first convex part and the second convex part.

9. The solid state battery according to claim 8, further comprising one or more third convex parts extending in the longitudinal direction between the first convex part and the second convex part on both of the first principal surface and the second principal surface.

10. The solid state battery according to claim 8, wherein the first convex part or the second convex part includes a convex part on the protective layer, a convex part on the first external electrode, and a convex part on the second external electrode.

11. The solid state battery according to claim 8, wherein the solid state battery further defines a first side surface and a second side surface facing each other in the transverse direction, wherein the first convex part and the second convex part form a part of both of the first side surface and the second side surface.

12. The solid state battery according to claim 11, wherein both of the first side surface and the second side surface are curved surfaces.

13. The solid state battery according to claim 8, wherein the first convex part and the second convex part have a curved shape in a sectional view in the transverse direction.

14. The solid state battery according to claim 13, wherein the first convex part has a degree of curvature different from a degree of curvature of the second convex part.

15. An electronic device comprising:
an elongated board; and
the solid state battery according to claim 1 mounted on the board, wherein the board has a longitudinal direction that coincides with the longitudinal direction connecting the first external electrode and the second external electrode of the solid state battery.

* * * * *